United States Patent
Schulten

(10) Patent No.: US 10,325,216 B2
(45) Date of Patent: Jun. 18, 2019

(54) SYSTEM AND METHOD THAT FACILITATES A DECISION MAKING PROCESS

(71) Applicant: Ernest Schulten, Edison, NJ (US)

(72) Inventor: Ernest Schulten, Edison, NJ (US)

(*) Notice: Subject to any disclaimer, the term of this patent is extended or adjusted under 35 U.S.C. 154(b) by 845 days.

(21) Appl. No.: 14/456,446

(22) Filed: Aug. 11, 2014

(65) Prior Publication Data

US 2015/0046386 A1 Feb. 12, 2015

Related U.S. Application Data

(60) Provisional application No. 61/864,290, filed on Aug. 9, 2013.

(51) Int. Cl.
| | |
|---|---|
| G06N 5/02 | (2006.01) |
| G06N 5/04 | (2006.01) |
| G06F 16/2457 | (2019.01) |
| A63F 13/828 | (2014.01) |
| A63F 13/46 | (2014.01) |

(52) U.S. Cl.
CPC ............ G06N 5/046 (2013.01); A63F 13/46 (2014.09); A63F 13/828 (2014.09); G06F 16/24578 (2019.01); G06N 5/02 (2013.01)

(58) Field of Classification Search
CPC ...................................................... G06N 5/02
USPC ........................................................ 706/62
See application file for complete search history.

(56) References Cited

PUBLICATIONS

Isaac Petersen ("Fantasy Football Auction Draft Optimizer Tool" Jun. 14, 2013).*
Luke ("2012 Position Analysis & Draft Outlook—First Base" Mar. 9, 2012).*
Isaac Petersen ("Calculating Custom Fantasy Football Projections for Your League using R" Mar. 10, 2013).*
An online article ("Hodges-Lehmann estimator" from Wikipedia. retrieved Apr. 16, 2017.*
ClickySports ("Use Clicky Draft for your fantasy league's draft" Apr. 2013).*

* cited by examiner

*Primary Examiner* — Lut Wong
(74) *Attorney, Agent, or Firm* — Gearhart Law, LLC

(57) ABSTRACT

A system and method can be used to facilitate a strategy for decision making in a fantasy sports league. The method can be used in conjunction with a web or mobile based application. By entering data into the various matrices associated with the application, a customized data set can be created. This data set can then be used with graphical overlays to facilitate future decision making based on created scores attributable to each individual athlete. The end result being a streamlined process that gives one an advantage over others in the fantasy sports league.

6 Claims, 4 Drawing Sheets

| Player | Team | Fantasy Points | Blueprint Score | PPR ADP 8 | PPR ADP 10 | PPR ADP 12 |
|---|---|---|---|---|---|---|
| Aaron Rodgers | GB | 347 | 42.4 | 24.0 | 24.0 | 24.0 |
| Peyton Manning | DEN | 329 | 24.9 | 13.0 | 13.0 | 13.0 |
| Drew Brees | NO | 357 | 52.6 | 22.0 | 22.0 | 22.0 |
| Andrew Luck | IND | 308 | 3.1 | 59.0 | 56.0 | 59.0 |
| Matthew Stafford | DET | 304 | -1 | 50.0 | 48.0 | 50.0 |
| Robert Griffin III | WAS | 290 | -14.7 | 74.0 | 72.0 | 74.0 |
| Matt Ryan | ATL | 288 | -16.6 | 82.0 | 79.0 | 82.0 |
| Colin Kaepernick | SF | 279 | -25.2 | 98.0 | 94.0 | 98.0 |
| Nick Foles | PHI | 293 | -11.5 | 71.0 | 67.0 | 71.0 |
| Tony Romo | DAL | 281 | -23.4 | 92.0 | 90.0 | 92.0 |
| Tom Brady | NE | 286 | -18.3 | 79.0 | 76.0 | 79.0 |
| Jay Cutler | CHI | 275 | -29.5 | 102.0 | 99.0 | 102.0 |
| Cam Newton | CAR | 292 | -12.4 | 90.0 | 87.0 | 90.0 |
| Russell Wilson | SEA | 276 | -28.7 | 120.0 | 115.0 | 120.0 |
| Ben Roethlisberger | PIT | 261 | -43.8 | 126.0 | 122.0 | 126.0 |
| Ryan Tannehill | MIA | 254 | -50.9 | 159.0 | 200.0 | 159.0 |
| Andy Dalton | CIN | 252 | -52.3 | 132.0 | 127.0 | 132.0 |
| Philip Rivers | SD | 260 | -44.6 | 112.0 | 107.0 | 112.0 |
| Carson Palmer | ARI | 246 | -58.6 | 154.0 | 134.0 | 154.0 |
| Josh McCown | TB | 240 | -64.9 | 153.0 | 133.0 | 153.0 |
| Eli Manning | NYG | 226 | -78.7 | 146.0 | 134.0 | 146.0 |
| Alex Smith | KC | 244 | -60.6 | 163.0 | 200.0 | 163.0 |
| Joe Flacco | BAL | 227 | -77.7 | 200.0 | 200.0 | 200.0 |
| EJ Manuel | BUF | 210 | -94.9 | 200.0 | 200.0 | 200.0 |
| Johnny Manziel | CLE | 197 | -108 | 143.0 | 130.0 | 143.0 |
| Sam Bradford | STL | 204 | -100.1 | 162.0 | 200.0 | 162.0 |
| Geno Smith | NYJ | 154 | -150.5 | 200.0 | 200.0 | 200.0 |

FIG. 2

| Overall Rank | Position Rank | Position | Player | Team | Fantasy Points | ATT's | COMP's | Yds | TDs | INTs | 300+ |
|---|---|---|---|---|---|---|---|---|---|---|---|
| 2 | 2 | QB | Peyton Manning | DEN | 26.96 | 45 | 29 | 374 | 3 | 0 | 1 |
| 3 | 3 | QB | Drew Brees | NO | 25.06 | 46 | 33 | 369 | 2 | 1 | 1 |
| 9 | 8 | QB | Jay Cutler | CHI | 20.14 | 41 | 26 | 341 | 2 | 1 | 1 |
| 7 | 6 | QB | Andy Dalton | CIN | 20.44 | 40 | 26 | 336 | 3 | 0 | 1 |
| 1 | 1 | QB | Andrew Luck | IND | 28.46 | 40 | 28 | 329 | 3 | 1 | 1 |
| 6 | 5 | QB | Philip Rivers | SD | 20.82 | 36 | 26 | 313 | 2 | 0 | 1 |
| 8 | 7 | QB | Tom Brady | NE | 20.36 | 38 | 25 | 309 | 2 | 1 | 1 |
| 12 | 10 | QB | Nick Foles | PHI | 19.42 | 44 | 26 | 293 | 1 | 1 | 0 |
| 72 | 25 | QB | Matt Ryan | ATL | 11.58 | 43 | 24 | 282 | 2 | 2 | 0 |
| 10 | 9 | QB | Ben Roethlisberger | PIT | 19.52 | 40 | 23 | 278 | 3 | 1 | 0 |
| 4 | 4 | QB | Matthew Stafford | DET | 23.4 | 37 | 24 | 275 | 2 | 0 | 0 |
| 17 | 14 | QB | Kyle Orton | DAL | 17.26 | 39 | 23 | 274 | 2 | 1 | 0 |
| 13 | 11 | QB | Ryan Tannehill | MIA | 19.04 | 35 | 22 | 271 | 2 | 0 | 0 |
| 20 | 17 | QB | Aaron Rodgers | GB | 17.14 | 37 | 23 | 271 | 2 | 1 | 0 |
| 40 | 20 | QB | Joe Flacco | BAL | 14.78 | 41 | 24 | 262 | 1 | 0 | 0 |
| 25 | 19 | QB | Eli Manning | NYG | 16.98 | 37 | 22 | 257 | 2 | 2 | 0 |
| 14 | 12 | QB | Cam Newton | CAR | 18.46 | 29 | 19 | 254 | 2 | 0 | 0 |
| 65 | 23 | QB | Chad Henne | JAC | 12.18 | 37 | 24 | 252 | 1 | 2 | 0 |
| 22 | 18 | QB | Ryan Fitzpatrick | TEN | 16.68 | 37 | 23 | 252 | 2 | 1 | 0 |
| 50 | 22 | QB | Matt Cassel | MIN | 13.9 | 32 | 21 | 250 | 2 | 0 | 0 |
| 89 | 29 | QB | Geno Smith | NYJ | 10.02 | 38 | 21 | 248 | 0 | 2 | 0 |
| 18 | 15 | QB | Kirk Cousins | WAS | 17.22 | 38 | 22 | 246 | 2 | 1 | 0 |
| 66 | 24 | QB | Carson Palmer | ARI | 12.06 | 34 | 21 | 244 | 1 | 1 | 0 |
| 130 | 32 | QB | Kellen Clemens | STL | 7.8 | 36 | 21 | 235 | 0 | 1 | 0 |
| 74 | 26 | QB | Case Keenum | HOU | 11.42 | 38 | 21 | 233 | 1 | 1 | 0 |
| 99 | 31 | QB | Jason Campbell | CLE | 9.52 | 33 | 19 | 228 | 1 | 1 | 0 |
| 76 | 27 | QB | Matt Schaub | HOU | 11.3 | 35 | 22 | 228 | 1 | 0 | 0 |
| 19 | 16 | QB | Russell Wilson | SEA | 17.16 | 29 | 19 | 224 | 1 | 0 | 0 |
| 15 | 13 | QB | Colin Kaepernick | SF | 17.78 | 27 | 15 | 222 | 1 | 0 | 0 |
| 83 | 28 | QB | Thad Lewis | BUF | 10.7 | 33 | 18 | 220 | 1 | 2 | 0 |
| 43 | 21 | QB | Terrelle Pryor | OAK | 14.28 | 31 | 19 | 217 | 1 | 2 | 0 |
| 98 | 30 | QB | Mike Glennon | TB | 9.58 | 27 | 17 | 177 | 1 | 1 | 0 |

FIG. 3

SYSTEM AND METHOD THAT FACILITATES A DECISION MAKING PROCESS

CLAIM OF PRIORITY

This application claims priority to U.S. Application Ser. No. 61/864,290 filed on Aug. 9, 2013 the contents of which are fully incorporated herein by reference in its entirety.

FIELD OF THE EMBODIMENTS

This invention and its embodiments relate to systems and methods of data entry and organization, namely inputting information into an application which calculates values based partially on the user inputted information. In particular, the present invention and its embodiments relate to the entry of data into a program whereby the program assists the user in making future decisions based on user inputted values.

BACKGROUND OF THE EMBODIMENTS

Various software application users, particularly spreadsheet application users, are using such programs in more and more sophisticated ways. While spreadsheets were once primarily used to facilitate financial and technical calculations and analyses, users are now seeking ways to customize these data entry tools for specific purposes. Often, these spreadsheet applications can be used to create functioning tools that can be accessed through the internet, a mobile/web application, or the like or combinations thereof.

Participation in "fantasy sports" has increased greatly over the past decade. Fantasy sports entails a group of individuals selecting current professional athletes to form a "team." A team is selected during a draft in which these individuals take turns selecting players from a sports league such as the National Football League or Major League Baseball. With this team, the group of individuals compete against one another using real-life statistics generated by each team's respective players in games, matches, contests, etc. The players' statistics are turned into a point valuation that contributes to the fantasy teams' score. The fantasy team with the highest score at the end of the contest period, typically over the course of a day or week, is to be deemed the winner. Two different teams will then play each other over the next contest period.

The advent of computers and the internet that gave rise to the dot com boom of the early $21^{st}$ century, also provided a wealth of information for consumers and gave the consumers instantaneous access to this information. A new era in the fantasy sports market was borne. Today, fantasy sports is a billion dollar business and has reveled in its ever-growing popularity. However, there are still a number of shortcomings in this relatively new industry. For example, most players dedicate many hours to formulating the perfect strategy of player selection, only to have their strategy fail to materialize right before their eyes. Additionally, even with the prolific rise in fantasy sports participation, this is still a business with much untapped potential.

Thus, various devices are known in the art. However, their structure and means of operation are substantially different from the present disclosure. The other inventions fail to solve all the problems taught by the present disclosure. The present invention and its embodiments provide for a spreadsheet application that interprets data and makes recommendations for a decision making process. At least one embodiment of this invention is presented in the drawings below and will be described in more detail herein.

SUMMARY OF THE EMBODIMENTS

One method of implementing the present invention is described and taught having the steps of providing a computer readable storage medium storing one or more programs for execution by one or more processors, wherein the one or more programs has instructions for providing a data entry application to a wired or wireless device, inputting at least one variable into at least one of a plurality of data entry points in at least one data matrix; the data entry application operating on the at least one variable thereby generating a custom data set in a ranking and sorting matrix; and providing at least one visual cue in the ranking and sorting matrix.

In another aspect of the present invention there is a system that has an audiovisual display for displaying and communicating desired content; a processor based computing device capable of being connected to a network; a computer readable storage medium storing one or more programs for execution by the processor based computing device, wherein the computer readable storage medium further contains instructions, that when executed on the processor based computing device, causes execution of the one or more programs, wherein the one or more programs has instructions for providing a data entry and organization application to a wired or wireless device wherein the fantasy sports application has at least a scoring matrix, a player matrix, a global matrix, or any combination thereof that can be combined to form a ranking and sorting matrix, wherein the ranking and sorting matrix identifies a position and ranking of each player, wherein each player is sorted according to a player position designation and wherein each player is ranked within the player position designation by a scoring variable.

Generally, the present invention and its embodiments provide a tool that enables one to parse data and create various visual representations therefrom. A number of matrices are used in order to input various data variables into the application, with the application being mobile or web based and in some instances taking the form of a webpage(s). The entire format provides a visual representation of not only player ranking and sorting but provides visual indicators using, in some cases, external data to predict the availability of a player during a fantasy sports draft. This enables a player to have an advantage over the competition by being able to predict when a player should be drafted and the value that player holds versus where others may view that value.

In general, the present invention succeeds in conferring the following, and others not mentioned, benefits and objectives.

It is an object of the present invention to provide an application that assists a user in making selections in a fantasy football draft.

It is an object of the present invention to provide visual cues that enable a decisive and effective decision making process.

It is an object of the present invention to provide a ranking and sorting of individual athletes subject to a fantasy sports league.

It is an object of the present invention to provide a ranking and sorting system utilizing multiple layers to create multiple, simultaneous interpretations of the data.

It is an object of the present invention to provide an application that provides analysis as to when a player should be drafted in a fantasy sports draft.

BRIEF DESCRIPTION OF THE DRAWINGS

FIG. 2 is a graphical representation of a player matrix.

FIG. 3 is a graphical representation of a second player matrix.

DESCRIPTION OF THE PREFERRED EMBODIMENTS

Figure 1:
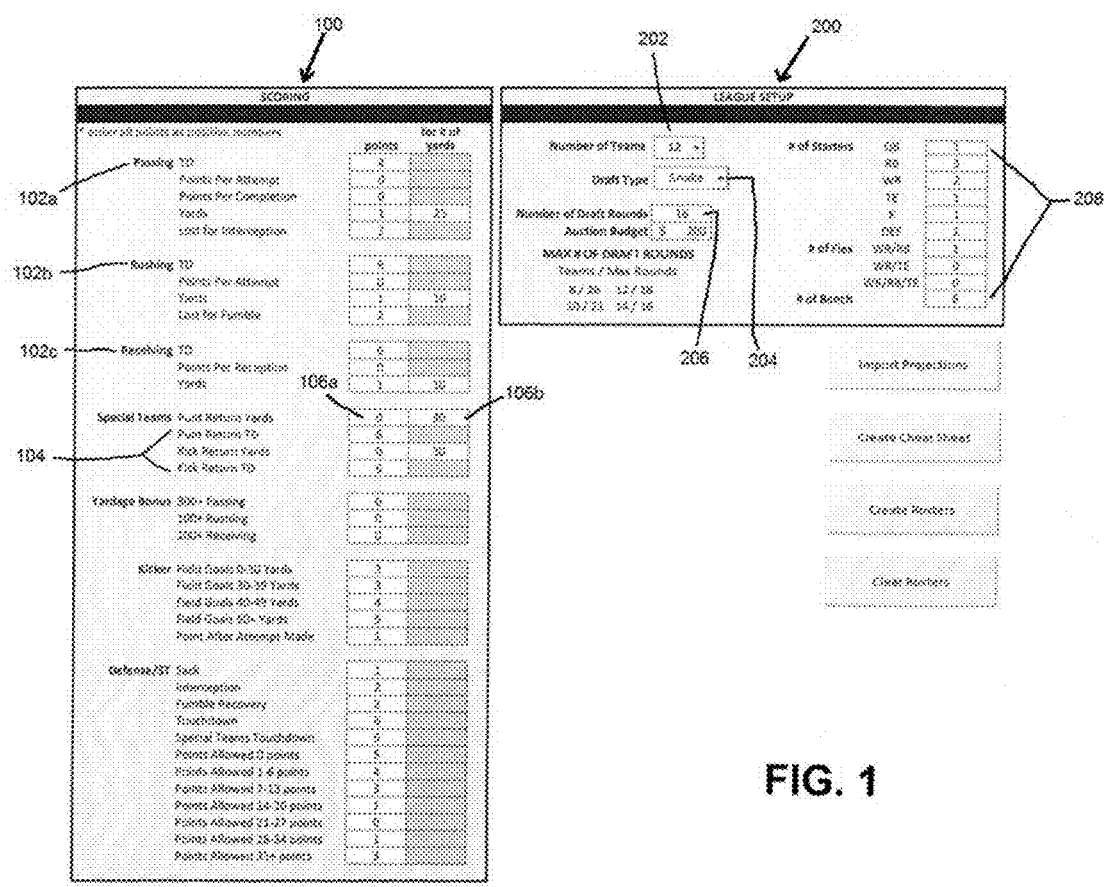
FIG. 1 is a graphical representation of a scoring matrix and global matrix.

A portion of the material in this patent document is subject to copyright protection under the copyright laws of the United States and/or other countries. The owner of such material has no objection to the facsimile reproduction by anyone of the patent document or the patent disclosure, as it appears in the United States Patent and Trademark Office publicly available file or records, but otherwise reserves all copyright rights whatsoever.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, there is a scoring matrix 100 and a global matrix 200. The scoring matrix 100 enables the input of scoring variables attributable to the fantasy league. Thus, one may be able to import scoring rules from an existing league or manually enter such rules. The scoring rules are defined by a number of rules, or constraints, that dictate the categories of scoring rules. Exemplary categories may be passing 102a, rushing 102b, or receiving 102c. Each of these categories may have any number of subcategories 104. Across from each category or subcategory are variables 106a-b. Variables may exist in a one to one correspondence with the categories or subcategories, or each category or subcategory may have multiple variables giving leeway to the scoring rules of the league.

Thus, as shown in FIG. 1, there is a point variable 106a and a modifier variable 106b. The point variable 106a dictates the points to be assigned to a particular condition being met by an athlete. For example, if a player (athlete) were to score a receiving touchdown, one would find the receiving category 102c and find the touchdown (TD) subcategory thereunder. The point variable 106a for a receiving touchdown is six points. Thus, any receiving touchdown to occur in the fantasy league would result in six points being awarded to the fantasy team.

The modifier variable 106b can be used to reward performance thresholds that are, in this instance, not a touchdown. For example, under receiving 102c there is a subcategory for "yards" or receiving yards gained. The point variable 106a is one point for this subcategory. Under the modifier variable 106b, there is a value of ten for this particular subcategory. Thus, for each ten yards gained receiving by a particular player, the fantasy team earns one point. As the scoring matrix illustrates, there are a wide number of point variables 106a and modifier variables 106b to be assigned values. In some instances, a particular category or subcategory may not be used. In other instances, custom categories may be added or the categories may be changed as applicable to match the fantasy sport in question.

Further, in FIG. 1, there is a global matrix 200 which contains global settings for the league. Here, there may be a drop down menu for the team selection 202 and a drop down menu for the type of league 204.

The team selection 202 allows one to modify the number of teams to be represented by "owners" in the fantasy league. The type of league 204 may also vary and can be based on the type of draft (i.e. snake, straight, etc.) or may permit an auction style where players are assigned a dollar or point value with the owners receiving a certain amount of points or money to spend in the draft.

There can also be a selection of the number of rounds 206 to occur in any one draft. The number of rounds may also be preset depending on the number of player per team 208. Here, a user can enter the number of player allowable for each class or category of player and this number combined with the team selection 202 will allow for a round generation. Typically, a league permits for teams from about eight to about fourteen in number with a given team in a league typically having about sixteen players per team. However, the exact rules and specifications will vary by the league and fantasy sport being played.

In FIG. 2, there is a player matrix which displays the player 302, the physical team 304 on which the player is associated, the projected fantasy points 306 for a given player, the blueprint score 308 for a given player, and the average draft position for an eight team league 310, ten team league 312, and twelve team league 314. This information is included for each player 316 listed in the matrix. The information contained herein is projected information based on predicted performance standards for an entire sporting season.

The blueprint score 308 is an identifier that assigns a numerical value to a player that is representative of their projected performance against the "average" starting player at that position. In order to assign a blueprint score 308, a mean score is determined based on the number of starting positions in the league, as dictated by the global matrix in FIG. 1, multiplied by the number of teams in the league. This mean is then subtracted from the projected player's fantasy points. As shown in FIG. 2, the players are than ranked according to this score. A positive score indicates the player is an above average player whereas negative scores correlate to a below average player.

The predicted, or average draft position, shown in columns 310, 312, and 314 are calculated based on computer simulations, actual fantasy draft data, or a combination thereof. The application may allow for certain settings to be made and have the computer run a number of simulation based on characteristics such as a position preference, blueprint score, average fantasy points per week, position on depth chart, reliability, consistency, and the like. These simulations, as noted, can be used singularly or in conjunction with previous fantasy drafts that have occurred. It may be preferable to mine data of actual fantasy drafts that have occurred previously to see where a particular player's perceived value may lie.

For example, based on the matrix shown in FIG. 2, Peyton Manning's average draft position is about 13, whereas Drew Brees' draft position is about 22. However, Brees' blueprint score indicates that he is the top performing quarterback. This allows an individual conducting a fantasy draft to see a mathematically attributed value in different players in relation to where their actual value is being perceived by the fantasy sports community. Thus, rather than taking Manning early in the draft, an individual may be able to wait and take the better player later in the draft, and take a different player closer to where one may not be available by the next selection.

Referring now to FIG. 3, there is a graphical representation of player projections for a single week of a sporting season 400. The projections contain the overall rank 402 of the player, the position rank 404 of the player, the position 406 of the player or groups of players, the player name 408, the team 408 for which the player is a member, the projected weekly fantasy points 412, and the projected statistics 414 for a given player.

For example, Peyton Manning is listed as having an overall rank 402 of two and a position rank 404 of two as well. The projected statistics 414 for a given player for a given week are transformed via the numerals, or variables, input in the scoring matrix 100, as shown in FIG. 1, into a projected weekly fantasy point score 412. This can be repeated for, in this case, a sixteen week National Football League season to give rise to the fantasy score 306 as shown in FIG. 2. This matrix is most helpful in making week to week decisions and may also be used in a "daily fantasy league" rather than a fantasy league which spans the length of a sporting season. Daily leagues are done on a week to week basis with new players selected each week based on an expectation of performance for that particular week.

Figure 4:
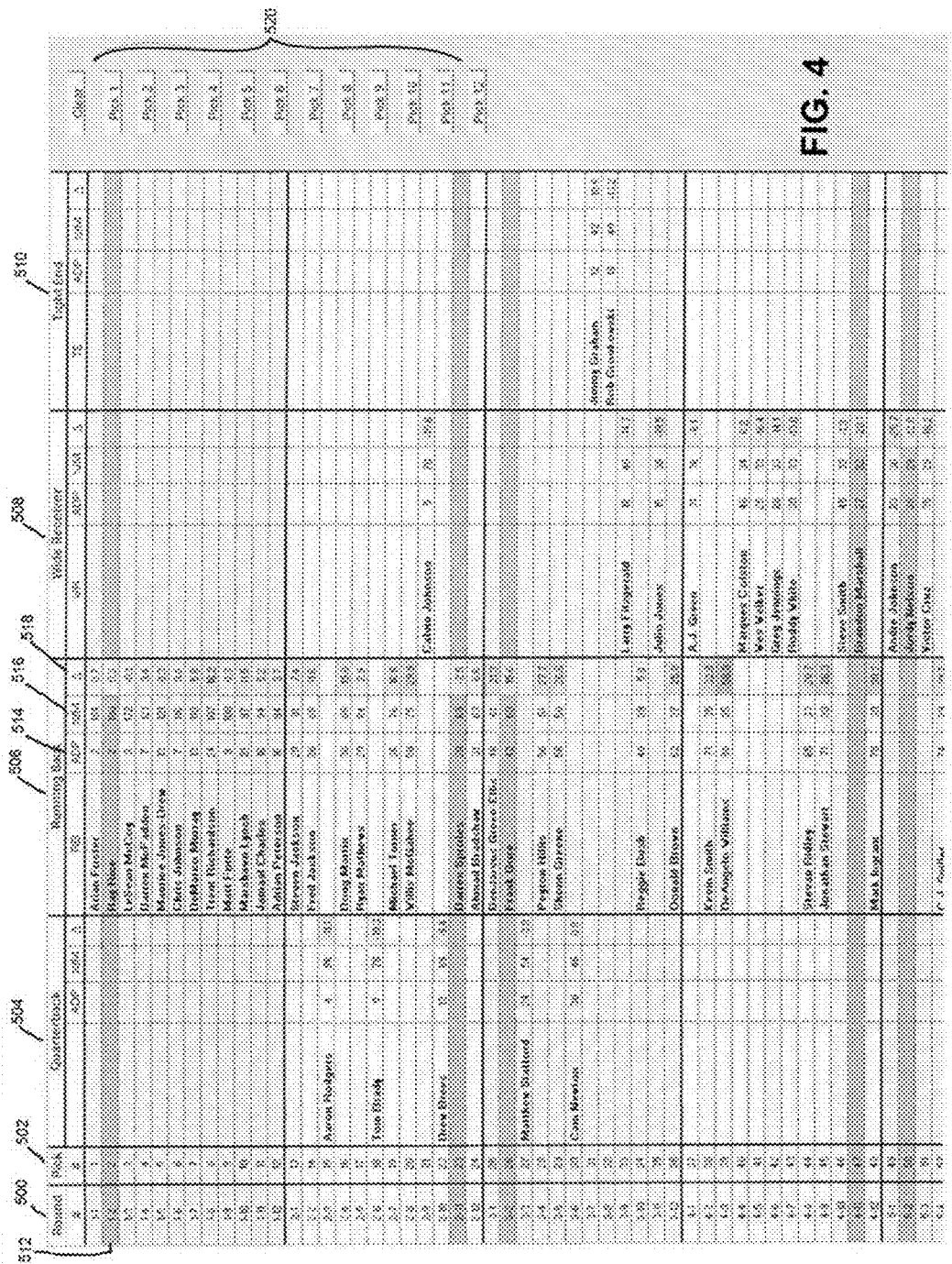
FIG. 4 is a graphical representation of a ranking and sorting matrix.

In FIG. 4, there is a ranking and sorting matrix based partly on the information supplied in previous FIGS. 1-3 and other data extrapolated by the application to give a comprehensive sorting and ranking of players of a sporting league. Here, the players are arranged categorically by position: quarterbacks 504, running backs 506, wide receiver 508, and tight end 510. These positions are representative and may include various combinations of positions including those not shown.

For each player, there is a column for the average draft position (ADP) 514, the points over the mean (P-M) or blueprint score 516, and delta (Δ) 518. The average draft position 514 may be computed by the application by data mining information associated with a third party such as ESPN or Yahoo. Such third parties can be accessed to by the application to obtain such a heuristic solution to the vast quantities of data attributable to such sites that host popular fantasy leagues for players all over the globe. The average draft position 514 then shows where, on average, this player is being selected by individual users.

The projected points over the calculated mean (P-M) 516 provides a numerical value that displays the projected fantasy points for a given player over the mean points attributable to a player of the same position in the same sporting league or discipline. Players with higher values in this statistical category represent better overall players, as they are ranked higher over the "average" player. Additionally, this provides for comparison within a player position and across multiple player positions.

For example, an individual conducting a fantasy draft may have the option to choose a wide receiver with a blueprint score 516 of 57, whereas a running back has a blueprint score 516 of 12. By comparing the projected fantasy points of a player over the mean for a given position one can see that the wide receiver is statistically a better player even if their projected overall fantasy point totals are similar. Thus, depending on the draft situation it would prove advantageous to the system user to take the wide receiver over the running back even though a typical fantasy player would not be able to make this connection.

The delta (Δ) 518 represents the magnitude between a given player's individual positional ranking and their average draft position 514. These values may be color coded in any number of ways to enable an individual participating in a fantasy draft a quick and easy way to discern between the vast numbers of players. In turn, players can then identify players who are much better or worse than what their average draft position 514 is indicating. The Δ 518 can then be combined with other factors, such as the blueprint score 516, to provide a more comprehensive assessment of a given player.

For example, a player with a high P-M, or blueprint score 516, and a positive Δ (zero being the baseline) can potentially be selected later in the draft. This allows an individual to select a different player with a P-M 516 and Δ 518 that indicates the player will likely not remain on the draft board for long while preserving the chance to receive another quality player, mentioned above, with their next selection. This increases the likelihood of a fantasy owner being able obtain more quality draft picks than another owner.

Across the vertical axis, there is a plurality of rows which correspond to the round 500 of the fantasy draft and the selection 502 of the draft. By using the pick indicators 520, one can activate a visual cue 512 which highlights certain rows that correspond to a particular fantasy players drafting position. The pick indicators 520 are a plurality of buttons that correspond to a draft position in the fantasy league. Given any one of the positions, an individual can select the pick indicator 520 for multiple positions causing a visual cue 512 to overlay the ranking and sorting matrix. This shows where an individual will be drafting for the entire draft. This overlay 512, in conjunction with the P-M and Δ described above, then enables an individual to make informed and tactical decisions about which players to draft and when to draft said players.

In totality, the ranking and sorting matrix provides a visual display of sorting and ranking simultaneously along multiple axes. The fantasy players are sorted across an x-axis by position and then sorted within that x-axis grouping in a vertical (y-axis) fashion. Thus, players are sorted within their positional groups. Further, there is another ranking that occurs which utilizes the x-axis where a left to right ranking organizes the players according to the overall rank rather than a positional rank. Therefore, an individual conducting a fantasy draft can simultaneously visualize not only the best player per positional group but the best players overall but examining the ranking and sorting matrix. The multiple layers of the ranking and sorting matrix provide a distinct advantage to the fantasy owner who employs such a system and methodology.

In turn, such fantasy sports players are typically more successful, as the ability to make such informed and quick decisions is crucial because leagues often impose time limits of one minute or less to make a given draft selection. Additionally, players may be taken off the board before it is anticipated, thus requiring someone to have a fall back strategy on the fly. Thus, not only can one plan the draft in advance giving them a leg up on the competition, but can then use the tool to make decisive and informed decisions on the spot and in the face of adversity.

The present invention and its embodiments have been described with relation to primarily American football, however, virtually any sporting contest may use the same principles contained herein including but not limited to hockey (ice and field), basketball, football (soccer), golf, baseball, swimming, track and field, cricket, automobile racing, and the like.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system comprising:
   an audiovisual display for displaying and communicating desired content;
   a processor based computing device capable of being connected to a network:
   a computer readable storage medium storing one or more programs for execution by the processor based computing device,
      wherein the computer readable storage medium further contains instructions, that when executed on the processor based computing device, causes execution of the one or more programs,
         wherein the one or more programs has instructions for providing a fantasy sports application to a wired or wireless device,
            wherein the fantasy sports application has at least a scoring matrix, a player matrix, a global matrix, or any combination thereof that can be used to form a ranking and sorting matrix,
            wherein the ranking and sorting matrix identifies a position and ranking of each player,
            wherein each player is sorted according to a player position designation and
            wherein each player is ranked within the player position designation by a scoring variable, and
      wherein the computer readable storage medium further contains instructions, that when executed on the processor based computing device, cause the processor to display, to a user, on the audiovisual display, a blueprint score for each player, a differentiation score for each player, and a color-coded listing of each player in the player matrix,
         wherein the blueprint score is obtained by generating a mean score, and subtracting the mean score from a projected point score of a particular player, and
         wherein the differentiation score represents a magnitude between a given player's overall positional ranking and the given player's average draft ranking, and
         wherein the color-coded listing correlates to a ranking of players in the player matrix.

2. The system of claim 1 wherein the fantasy sports application has at least one data matrix,
   wherein the at least one data matrix is selected from at least a scoring matrix, a player matrix, a global matrix, or any combination thereof.

3. The system of claim 1 wherein the ranking and sorting matrix ranks and sorts players of a spoiling league with graphical overlays using multiple sorting and ranking layers.

4. The system of claim 3 wherein the ranking and sorting of players is based on at least the blueprint score and a representation of actual value versus perceived value.

5. The system of claim 4
   wherein the mean score is based on the number of starting positions in the league multiplied by the number of teams in the league.

6. The system of claim 3 wherein the ranking and sorting matrix bather ranks players in a left to right or right to left manner according to their overall or all position ranking while simultaneously ranking by and within a player position designation.

* * * * *